F. McCARTHY.

APPARATUS FOR ENVELOPING MAILING MATTER.

APPLICATION FILED MAR. 23, 1920.

Reissued June 13, 1922. 15,385.

6 SHEETS—SHEET 1.

INVENTOR

Florence McCarthy

BY

J. B. Brandenburg

ATTORNEY

F. McCARTHY.

APPARATUS FOR ENVELOPING MAILING MATTER.

APPLICATION FILED MAR. 23, 1920.

Reissued June 13, 1922. 15,385.

6 SHEETS—SHEET 2.

INVENTOR

Florence McCarthy

BY

J. Rauchenberg

ATTORNEY

F. McCARTHY.

APPARATUS FOR ENVELOPING MAILING MATTER.

APPLICATION FILED MAR. 23, 1920.

Reissued June 13, 1922. 15,385.

6 SHEETS—SHEET 3.

INVENTOR

Florence McCarthy

BY

J. Thaudinby

ATTORNEY

F. McCARTHY.

APPARATUS FOR ENVELOPING MAILING MATTER.

APPLICATION FILED MAR. 23, 1920.

Reissued June 13, 1922. 15,385.

6 SHEETS—SHEET 4.

INVENTOR
Florence McCarthy
By J. Shandrew
ATTORNEY

F. McCARTHY.
APPARATUS FOR ENVELOPING MAILING MATTER.
APPLICATION FILED MAR. 23, 1920.
Reissued June 13, 1922.
15,385.
6 SHEETS—SHEET 5.
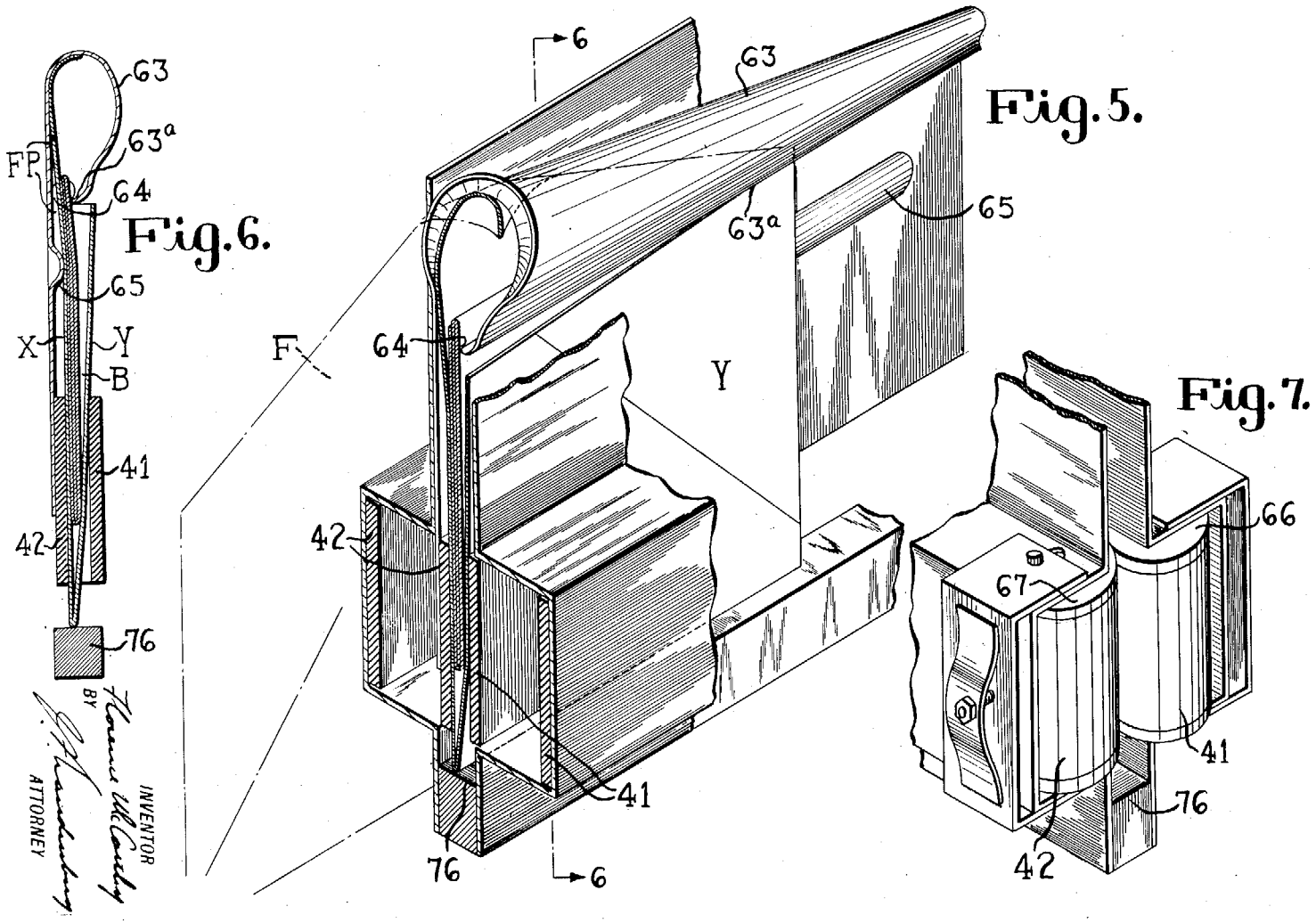
INVENTOR
Florence McCarthy
BY
J. Handsberg
ATTORNEY F. McCARTHY.

APPARATUS FOR ENVELOPING MAILING MATTER.

APPLICATION FILED MAR. 23, 1920.

Reissued June 13, 1922.

15,385.

6 SHEETS—SHEET 6.

INVENTOR

Florence McCarthy

BY

J. Handcock

ATTORNEY

UNITED STATES PATENT OFFICE.

FLORENCE McCARTHY, OF NEW YORK, N. Y., ASSIGNOR OF ONE-HALF TO JEROME WILE, OF NEW YORK, N. Y.

APPARATUS FOR ENVELOPING MAILING MATTER.

15,385. Specification of Reissued Letters Patent. Reissued June 13, 1922.

Original No. 1,305,390, dated June 3, 1919, Serial No. 221,614, filed March 11, 1918. Application for reissue filed March 23, 1920. Serial No. 368,150.

*To all whom it may concern:*

Be it known that I, FLORENCE McCARTHY, a citizen of the United States, and a resident of the borough of Manhattan, in the city, county, and State of New York, have invented a new and useful Apparatus for Enveloping Mailing Matter, of which the following is a specification.

The invention relates to an apparatus for the opening of envelopes, the inserting of circular matter within envelopes, and the subsequent moving of the flap of the envelope to a closed position.

An object of the invention is to construct an apparatus whereby a large number of envelopes with the desired contents, such as printed matter or the like, can be readily "filled" with a small outlay of labor and in a short period of time.

According to my invention there is provided a machine or apparatus wherein an envelope can be taken from a stack of envelopes, wherein the flap of the envelope thus removed can be automatically moved to open position and wherein the envelope can be positioned to receive the desired contents, wherein the contents required in that particular envelope can be removed from a stack and can be inserted in the envelope, and wherein the envelope and its contents can be subsequently moved to a position where the flap of the envelope will be moved to the desired closed position and the contents of the envelope will be pushed farther into the envelope if not sufficiently therein for the mailing of the envelope.

The invention relates to the features above referred to as well as to other features hereinafter fully described and clearly set forth in the appended claims.

As showing a specific embodiment of the invention reference is made to the accompanying drawings forming a part of this specification and in which drawings, Figure 1 is an end view of a machine for removing envelopes one at a time from the bottom of a stack of horizontally arranged envelopes and for feeding each envelope to a position for receiving its contents, and for removing a piece or batch of circular matter, one piece or batch at a time, from the bottom of a stack of horizontally arranged circular matter and for feeding or inserting a piece or batch of circular matter into the envelope when in position to receive its contents, for thereafter conveying the envelope with its contents to a place where the flap of the envelope is positioned, and finally delivering the envelope with the contents from the machine.

Fig. 2 is a transverse vertical section through the machine and is a view taken as on the plane indicated by the line 2—2 of Fig. 3 looking in the direction of the arrows. In Fig. 2 there is shown a storage magazine for the envelopes, at the left of the machine, and a storage magazine for the circular matter, at the right of the machine. In this figure there is also shown in section means for feeding the envelopes transversely to the right and to a position for receiving the contents, and a means for feeding the circular matter to the left and for causing the circular matter to be inserted in the envelope when the envelope is in position to receive the circular matter. Each of the feeding means just referred to has endless belts that serve to effect the feeding function. There is also shown in section means that supports the envelope when in the position for receiving the contents and also means for transferring the envelope in a longitudinal direction for the purpose of having its flap tucked in.

Fig. 3 is a plan view of the machine with parts thereof broken away. In this view a part of each magazine has been removed and also a part of the mechanism that transfers the envelopes to receiving position, and also a part of the associated mechanism that transfers the circular matter to and inserts it in the envelope. In this figure there is also shown in plan a horn and horizontally and longitudinally moving belts. The cooperating portions of these belts gradually approach each other in passing toward the delivery end of the machine. They are constructed so that they can convey an envelope when supplied with its contents from its receiving position, so that they can cooperate to convey the envelope as a whole horizontally and longitudinally of the machine, so that the flap portion of the body of the envelope and the flap of the envelope pass longitudinally to, along and through the horn, the horn being shaped so as to cause the flap to be tucked into the envelope as the envelope passes along and through the horn. In this figure it will be observed that the feeding mechanisms which include the several continuous belts are all operated by gearing from a common shaft.

Fig. 4 is a vertical elevation of the left-hand side of the machine looking in the direction of the arrow A of Fig. 3.

Fig. 5 is a perspective view showing in part a vertical transverse section and in part a longitudinal side view, with portions of the machine broken away, of the horn portion of the apparatus or machine. This view illustrates the manner in which the flap is bent or folded so that it is tucked into the envelope as the upper portion of the envelope moves along and through the horn. A portion of an envelope passing along the horn is indicated by broken and dotted lines in this figure, while the rest of the envelope and its contents is shown by the full lines.

Fig. 6 is a cross-sectional view taken as on the plane indicated by the line 6—6 of Figs. 3, 4 and 5. In said Fig. 6 there is indicated a rib or projection that engages the face or front of the envelope so as to place a bend in the envelope and contents in a manner to effect a separation between the inner side of the back of the envelope and the contents within the envelope, thus making an opening within which the flap readily enters as it is caused to do so by the horn.

Fig. 7 is a perspective view of the belt construction at the delivery end of the machine.

Figure 8:
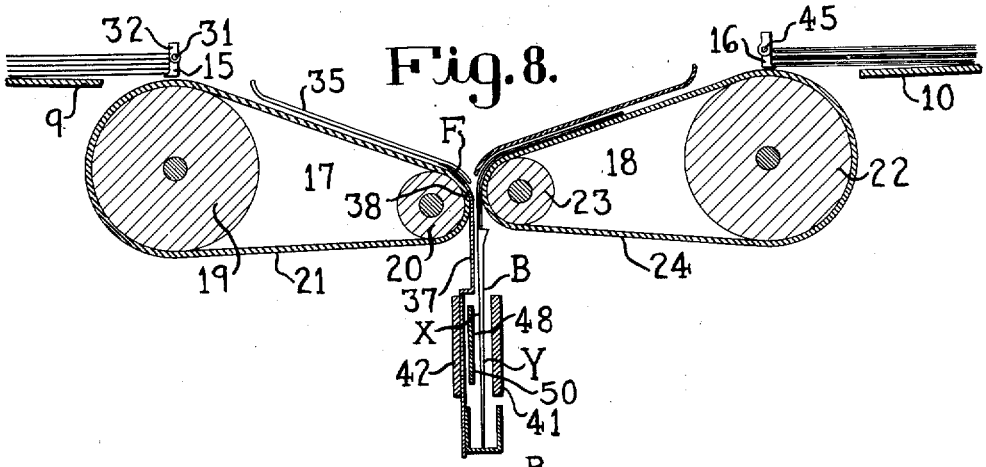
Figs. 8 to 14 illustrate some of the different stages that each envelope and each piece or batch of circular matter passes through from the time each leaves its respective stack until the circular matter is inserted into the envelope and until the envelope is delivered from the position where it received the circular matter.

In Fig. 8 there is shown the position of the envelope and the parts thereof when the envelope is receiving the circular matter. In this figure it will be noted that the envelope is not in engagement with the longitudinally moving belts which are arranged on opposite sides of the envelope.

Figure 9:
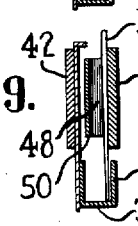

Fig. 9 shows the position which the envelope occupies after it has received its contents. In this figure it will be noted that the lower vertically extending portion of the envelope has been pushed transversely and to the right, by a pushing mechanism, or mechanism provided for this purpose, against a longitudinally moving belt and in this manner the envelope is moved edgewise in a longitudinal horizontal direction from its receiving position. The envelope is held against the longitudinal belt 41 by the pushing mechanism until the envelope is engaged at the opposite sides thereof by the two belts 41 and 42, which belts, it will be observed from an inspection of Fig. 3, gradually approach each other in passing toward the delivery end of the machine.

Figure 10:
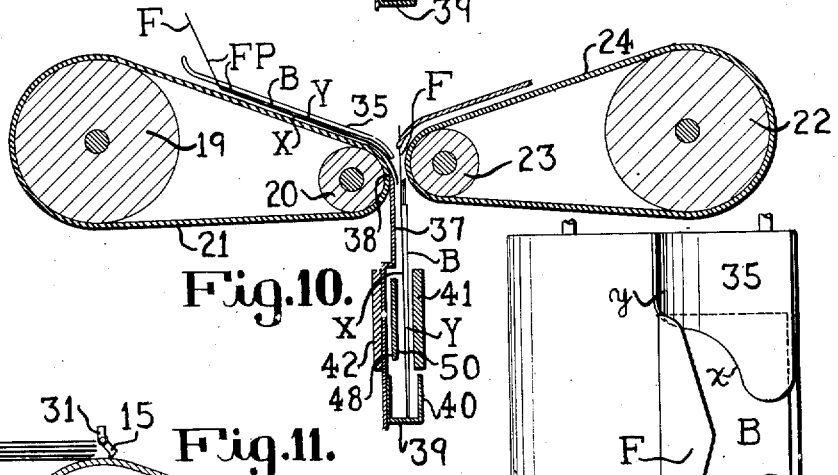

In Fig. 10 there is shown an envelope as it is being transferred longitudinally and horizontally away from receiving position by the coaction of the two longitudinally traveling belts, and in this figure it will be observed the pushing mechanism has been returned to its normal position—the position shown in Fig. 8 as well as in Fig. 10. When the filled envelope occupies the position shown in Fig. 10 an envelope to be filled is being brought into position as is indicated in said figure.

Figure 11:
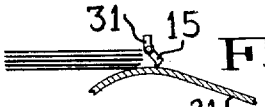

Fig. 11 shows an envelope at the bottom of the stack immediately after it is released by a controlling dog or feeding pawl and as it is being moved forwardly and transversely to the right by the continuous belt of the envelope feeding means.

Figure 12:
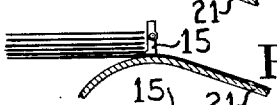

Fig. 12 shows the envelope somewhat farther removed from its previous position at the bottom of the stack.

Figure 13:
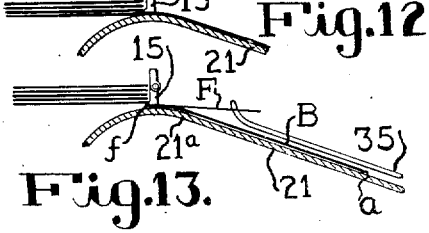

Fig. 13 shows the position of the envelope parts as the envelope is about to leave the stack of envelopes or the magazine holding them. In this Fig. 13 it will be noted that the body of the envelope is traveling in a path which extends to the right but is inclined slightly downwardly, while the rear flap portion of the envelope engages the last envelope left in the stack or the bottom of the controlling dog or feeding pawl of the magazine and is thus retained against upward movement. At the same time the envelope is pressed upwardly along a line adjacent to the rear flap edge and with this application of force there is made a curve in the bend in the body of the envelope. The flap of the envelope is free, however, to extend substantially horizontally, which it does. In this manner the body of the envelope is caused to move away from the flap as the envelope is conveyed from the stack, all of which is clearly indicated in Fig. 13. In Fig. 13 there is also indicated a guide construction that causes the body of the envelope to move along the path just referred to.

Figure 14:
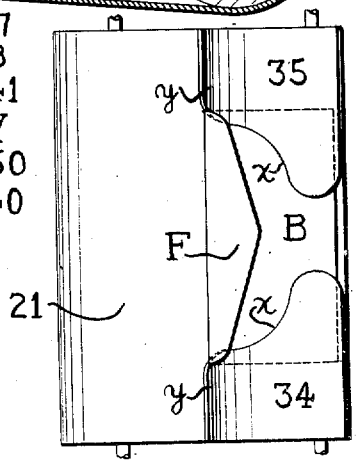

Fig. 14 is a plan view of the mechanism for conveying the envelopes transversely and to the right. In this view there will be seen the guide members which retain the envelopes in place on the traveling belt of the feeding mechanism and it will be noted that these guide members are shaped so as to enter the space between the body of the envelope and the under side of the flap whereby as the envelope continues its forward movement the flap will be gradually moved upwardly and rearwardly until the envelope is opened.

The frame of the machine has vertically and transversely extending plates 1 and 2, which may be referred to as spaced end plates, that are connected by longitudinally and vertically extending plates 3 and 4, which may be referred to respectively as a right-hand side plate and a left-hand side plate. Each of the end plates has at the right and left hand sides thereof upwardly extending portions, as $1^a$, $1^b$, $2^a$, $2^b$. Between these upwardly extending portions at the right-hand side of the machine there is provided a storage magazine C wherein circular matter is stacked preparatory to being used and between these upright portions at the left-hand side of the machine there is provided a storage magazine E wherein envelopes are stacked preparatory to being used. The envelopes and also the circular matter in each magazine extend horizontally. The envelopes are positioned in the magazine by a vertically and longitudinally extending stop 5 and by a vertically and transversely extending stop 6. The circular matter is positioned in the magazine by a vertically and longitudinally extending stop 7 and by a vertically and transversely extending stop 8.

The bottom of each magazine is defined, at least to a certain extent by the transversely and longitudinally, and substantially horizontally, extending plates 9 and 10. The vertically extending stop 5 is adjusted transversely of the machine by means of screw 11, the vertically extending stop 7 is adjusted transversely of the machine by means of screw 12, the vertically extending stop 6 is adjusted longitudinally of the machine by means of screw 13 and the vertically extending stop 8 is adjusted longitudinally of the machine by means of screw 14. By means of the several screws and stops the envelopes and the circular matter can be properly positioned in each magazine preparatory to being used in the machine.

At the lower forward portion of the magazine E—that is at the lower right-hand portion of the magazine E—there is a controlling dog, or feeding pawl as it may be called, 15 which is automatically and periodically operated as will hereinafter appear. The function of this dog or pawl is to release the envelope at the bottom of the stack whereby the released envelopes can be fed forwardly in a transverse direction into the machine. A similar controlling dog or feeding pawl 16 is provided at the lower forward portion of the magazine C—that is at the lower left-hand portion of the magazine C—whereby when released a piece or batch of circular matter at the bottom of the magazine will be fed forwardly in a transverse direction into the machine. The feeding means for the envelope is designated by 17 and the feeding means for the circular matter is designated by 18. The envelope feeding means 17, as it may be called, has a large pulley 19 and a small pulley 20 over and along the face of which pulleys a continuous belt, as 21, travels, as the pulleys are continuously rotated. One of these pulleys, to wit pulley 20, is a driven pulley. The circular matter feeding means 18, as it may be called, has a similar construction that includes a large pulley 22, a small pulley 23 and continuous belt 24. The pulley 20 of the envelope feeding means 17 has connected thereto, either directly or indirectly, a gear 25 which meshes with a gear 26 that is either directly or indirectly connected to the pulley 23 whereby the envelope feeding means and the circular matter feeding means will move in unison. Power for the machine is supplied in any suitable manner, as by means of hand-operated gear H that is in mesh with the gear 26. The pulleys of these two sets of feeding means 17 and 18 are carried on suitable shafting, as $19^s$, $20^s$, $22^s$ and $23^s$, mounted in suitable bearings, as $19^b$ and $22^b$, provided either in or on the spaced end plates 1 and 2.

Figure 1:
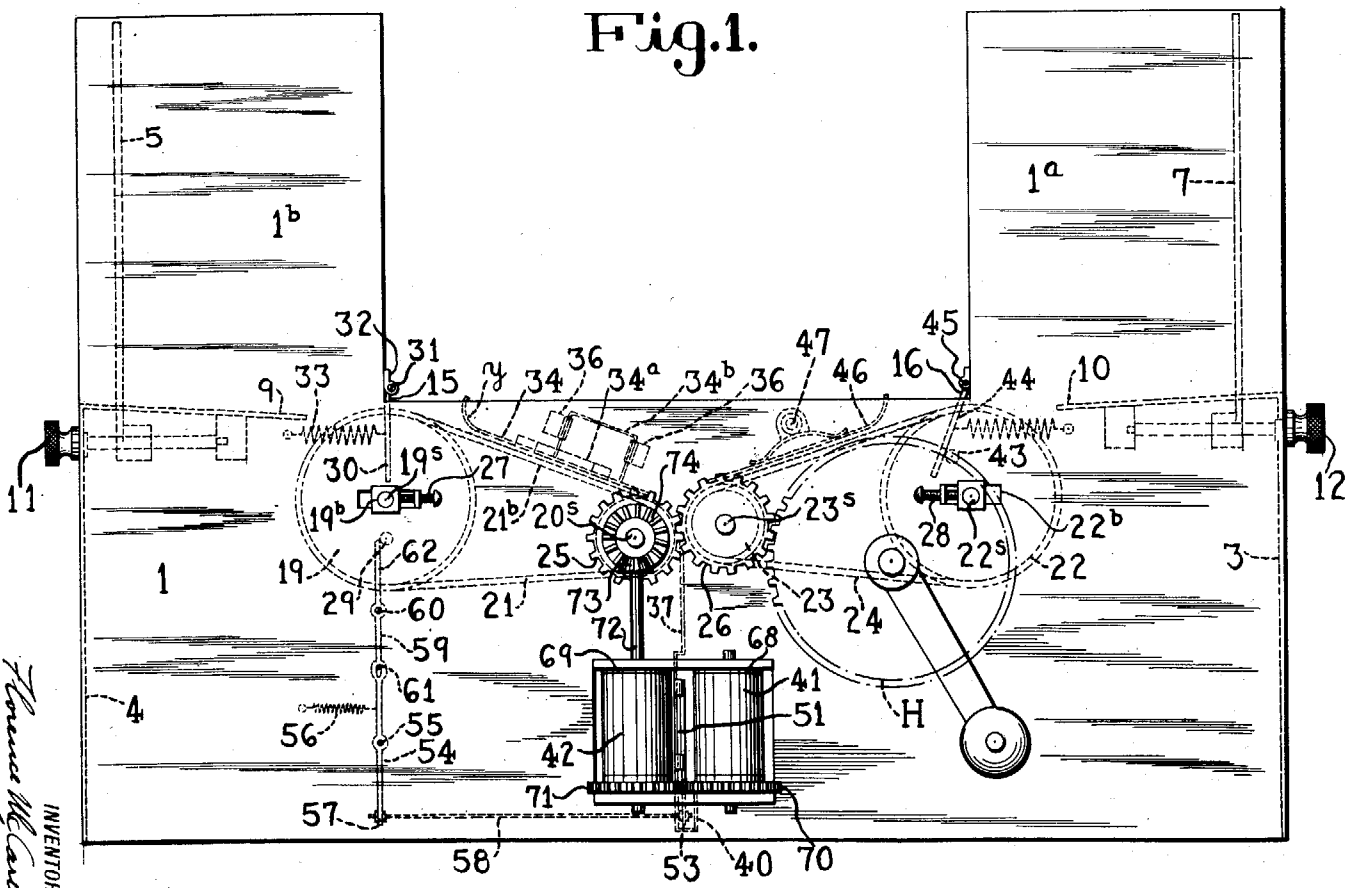

In Fig. 1 it will be observed that the bearings for the large pulleys are in the form of slidable blocks adjustably mounted on the spaced end plates by screws 27 and 28. By means of these screws the desired tension can be maintained on the endless belts, even though they become stretched in use. The pulley 19 has thereupon a pin or stop 29 which can be employed to perform two functions. One of these functions being to cause an operation of a pressing or pushing mechanism that is employed in effecting a longitudinal movement of the envelope from the position where it receives the circular matter. The construction of this mechanism and the function of the stop or pin 29 will be subsequently described more in detail. The other function of the pin or stop 29 is to move in engagement with an arm 30 connected to a shaft 31 which is also in turn connected to the controlling dog or feeding pawl 15. Shaft 31 is carried in suitable bearings, as 32, which are mounted on the frame of the magazine E. The arm 30 is held in its normal position by a tension spring 33 whereby the dog or pawl 15 normally occupies the position shown in Fig. 2. When the machine is operating, the pulleys of the envelope feeding means and of the circular matter feeding means operate in the direction indicated by the arrows. It will therefore be seen that each time the pulley 19 makes a revolution the stop associated therewith moves the arm 30 to the right away from its normal position in a manner to position the dog or pawl 15 as shown in Fig. 11. This will effect a release of the envelope at the bottom of the stack. However, before the envelope is entirely away from the stack— and in fact shortly after the envelope has started to move from its previous position at the bottom of the stack—the stop 29 disengages the arm 30 and the spring restores the arm 30 and its connected pawl 15 to normal position, as shown for example in Figs. 2 and 12. The continuous belt 21 preferably has a rubber face or is of suitable material to convey the envelope released from the bottom of the stack forwardly and toward the right; or in other words in a transverse direction from the stack along a slightly declined path. The envelopes are placed in the magazine in such a manner that the flap of the envelope is uppermost and the flap portion of the envelope is farthest from the dog or pawl, that is, from the front side of the magazine.

It will here be noted that the envelope may be referred to as having a front and a back, the front being that portion upon which the address is written, whereas the back is the portion where the seams or overlaps of the envelope are located. The movable part which would ultimately constitute a part of the back of an envelope, if sealed, is referred to as the flap, the flap portion is intended to designate the part adjacent to the flap and with which the flap is connected. The envelope may also be considered to have a body portion—which includes all but the flap—and a flap.

In the drawings the flap is designated by F, the end of the flap is designated by G, the flap portion is designated by FP, the closed long edge of the envelope is designated by CE, the body portion is designated by B, the front (or face) of the envelope is designated by X and the back of the envelope is designated by Y.

The envelope as conveyed from the stack successively assumes the position shown in Figs. 11, 12 and 13. In the last mentioned figure it will be observed that the body portion B of the envelope extends forwardly and downwardly, that the back or flap edge *f* of the envelope engages the under side of the dog or pawl 15 and that the curved portion $21^a$ of the conveying belt 21 extends slightly above the plane passing through the lower forward portion *a* of the envelope on the one hand and the under side of the dog or pawl on the other hand and in this way effects an upward pressure against the under side of the envelope along a line between the forward edge *a* of the envelope and the rear flap edge *f* of the envelope. With the pressure thus applied the free edge of the flap of the envelope will be away from the body of the envelope, as shown in Fig. 13.

Figure 2:
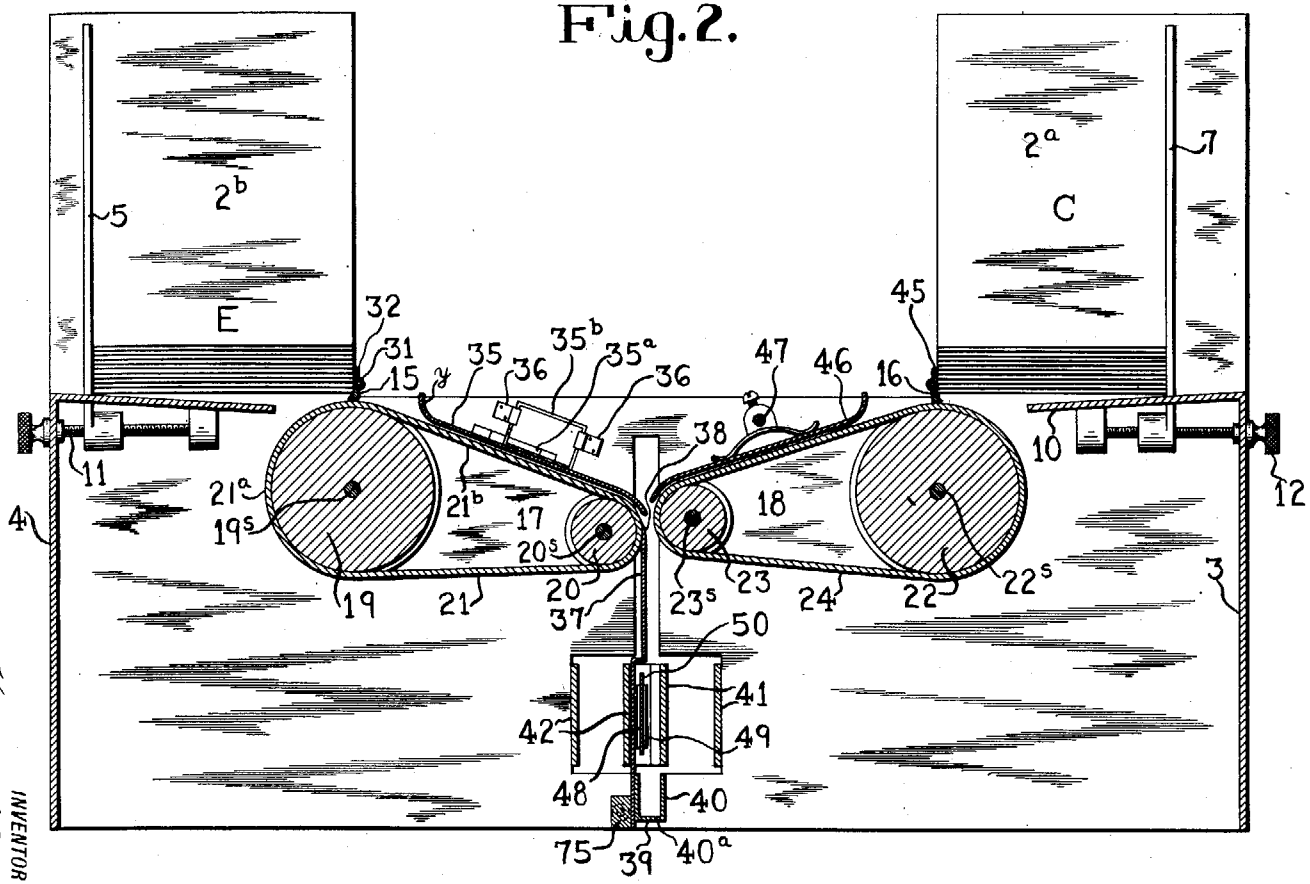

As the envelope travels along the slightly declined path the body of the envelope is maintained in engagement with the top conveying surface of the belt by means of the guide construction shown in section in Fig. 2. This guide construction preferably comprises two guide members 34 and 35. These members are shaped so as to be engaged by the under side of the flap as the envelope moves forwardly under the guide members whereby the flap will be moved upwardly and backwardly as the envelope travels transversely in a forward direction away from the magazine. The movement of the envelope along the declined path has herein been sometimes referred to as moving substantially along a substantially horizontal path because the inclination is not necessarily very great. These guide members are pivotally mounted at $34^a$ and $35^a$ upon the spaced end plates 1 and 2 and are spring-pressed to normal position by means of springs $34^b$ and $35^b$, respectively, which are secured in place as by clips 36. The portions of the guide members thus engaged by the flaps are designated by *x*. Each guide member 34, 35 has an upwardly and rearwardly extending portion *y* for insuring the outer forward ends of each envelope passing into the space between the guide members and the endless belt whereby the envelope will be sure to be conveyed by means of the belt below the guide members and thus effect the opening of the envelope by the turning of the flap back, as above described.

The forward lower edge portion of each guide member 34 and 35 is bent forwardly and downwardly so that the envelope, as it continues its travel, will take a downward path. There extends into the space between the belts of the two feeding means 17 and 18 a guide member, or stripper as it may be called, 37. This stripper extends longitudinally of the machine and has an upwardly and rearwardly extending lip 38 that approaches the upper surface $21^b$ of the endless conveying belt 21. The function of this stripper is to lift or remove the envelope from its belt and in the continued movement of the envelope about the periphery of the pulley 20 the envelope passes through the space between the lip 38 and the curved guide portion of the stripper over which the envelope travels on the one hand and the lower forward depending edge of the guide members 34 and 35 on the other hand. There is, however, a sufficient bite or grip of the endless belt on the portions of the envelope which are at the rear of the lip 38 to insure conveying of the envelope until it strikes a stop 39 that is provided in the bottom of a trough 40 that holds the envelope in the position which it occupies when receiving the circular matter.

When in this position, as is apparent from an inspection of Fig. 10, it will be observed that the body portion B of the envelope extends vertically and longitudinally, while the flap F of the envelope is bent backwardly and is held in this position by the lower forward edges of the guide members 34 and 35. The holding of the flap in this position causes the upright back Y of the envelope to be placed a slight distance from the upright front X of the envelope and when the envelope is in this position it can receive the circular matter to be inserted therein.

It will here be remarked that when the envelope is in this position, preparatory to and during the time that it is receiving the circular matter, the longitudinally extending belts 41 and 42 which continuously travel do not engage the envelope and thereafter the envelope can remain in said position until it receives the circular matter. At the proper time a stop or pin 43 that is connected to the pulley 22 of the circular matter feeding means 18 comes into engagement with an arm 44 that is connected to a shaft 45 carrying the dog or pawl 16 and causes a release of a piece or bunch of circular matter that is to be inserted in the envelope. The desired circular matter is then conveyed forwardly and to the left, that is in a transverse direction away from the magazine, by means of the endless belt 24. The circular matter is held in engagement with the endless belt by means of a spring-pressed guide member 46 which can be adjustably positioned along a rod 47. The lower forward edge of this guide member is bent downwardly and inwardly toward the left in a manner to direct the circular matter into the open envelope which is in position to receive it. The rod also carries a guide or positioning member 47ª that can be relied upon to control the longitudinal position of the circular matter as it is being conveyed forwardly in a transverse direction. The continued feed of this circular matter causes said circular matter to bend and be inserted almost entirely, if not entirely, within the envelope.

It will be manifest from an inspection of Fig. 2 that the circular matter has a somewhat downward path while it is being moved forward and transversely from the magazine, but this movement is sometimes referred to herein as a substantially horizontal movement because the downward slope is relatively small. The envelope with its contents is now ready to be delivered from the machine and there is brought into operation the mechanism 48 which engages the lower front face of the vertically and longitudinally extending envelope and forces the lower portion of the envelope transversely to the right into engagement with the belt 41, as shown in Fig. 9. This mechanism may be termed a periodically-acting traction clutch. The belt 41 is an endless continuously traveling belt, as will be manifest from an inspection of Fig. 3, and consequently the filled envelope will be conveyed longitudinally and horizontally from the place where it received its contents. This pushing or pressing mechanism 48 preferably has anti-friction rollers 49. These rollers are the parts which directly engage the envelope and they are carried in a swinging arm 50 pivotally mounted at 51. The arm 50 may be considered as a lever arm since it is fulcrumed at 51 and has an extension, as 52, that is provided with a depending end 53 connected to a series of levers under the control of the stop or pin 29 that is on or connected to the pulley 19.

The construction just referred to comprises a lever 54 pivotally mounted at 55 and held in normal position by the tension of a spring 56. The lower free end 57 of the lever 54 is connected by means of a rod 58 to the depending end 53 previously referred to. A second lever 59 is pivotally mounted at 60. The lower free end of this lever 59 is connected by a pin 61 to the upper end of the lever 54. The upper end 62 of the lever 59 is arranged in the path of movement of the pin or stop 29 whereby at the proper time the pushing mechanism 48 will come into play and thus perform its function.

From what has preceded it will be manifest that the pin or stop performs two functions; that of moving the lever 62 associated with the pushing mechanism 48 and also of moving the lever or arm 30 that controls the dog or pawl 15. Instead of using one pin to accomplish these two functions it will be manifest that a plurality of pins could be employed, the only essential requirement being that they be located so as to perform the desired function in the proper timed relationship. Ordinarily the belt 21 serves as a gearing between the pulleys 19 and 20, and the belt 24 serves as a gearing between the pulleys 22 and 23 and is sufficient to maintain the proper timed relation of the several parts. If, however, it were desired to have more positive gearing between the pulleys of the several sets this could be accomplished as by means of chain and sprocket construction between the pulleys or by any other suitable form of gearing.

From what has preceded it will also be observed that the envelope is first released, that it is fed in a forward direction with the flap uppermost and at the rear, that the flap is then turned upwardly and backwardly by suitable means as the envelope is moved forwardly in a slightly declined path, that the envelope is bent in its continued movement until the body portion of the envelope extends vertically and longitudinally with the flap thereof uppermost and bent backward behind the vertical, that at the proper time a piece or batch of circular matter is released from a magazine and moved forwardly and finally bent downward whereby it can be and is fed into the envelope, when positioned as previously described. When the envelope has received its contents and at a predetermined time pushing mechanism is brought into play to cause the longitudinally moving belts to convey the envelope, still in a vertically and longitudinally extending position, edgewise from the position where it received its contents, that is to say, from the loading station. At the proper time another envelope is released from the bottom of the stack and the cycle of operations just described can be repeated.

Figure 3:
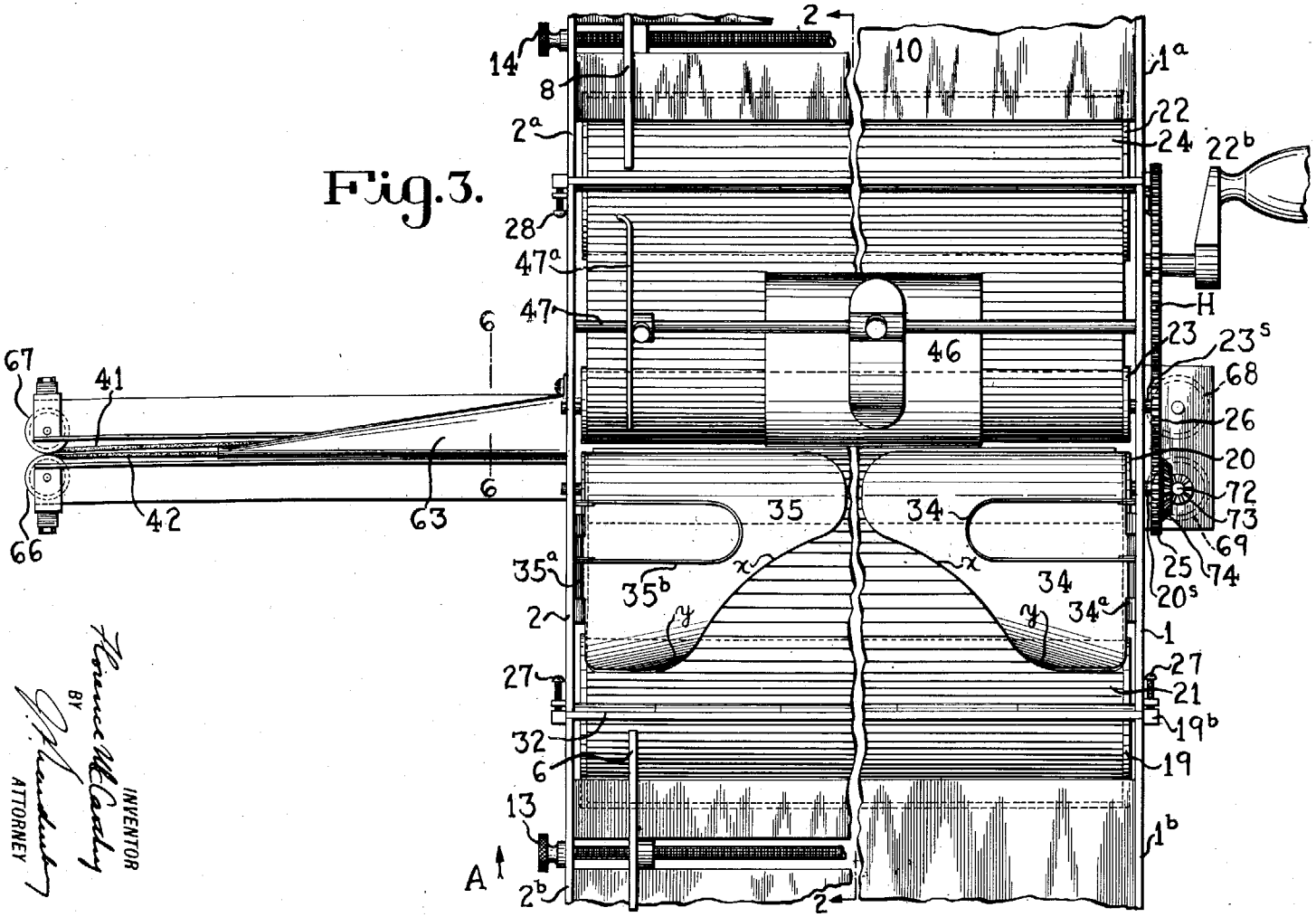

The next function of the machine is to move the flap of the envelope to the final desired position relative to the body of the envelope. In the apparatus as constructed there is provided a longitudinally extending horn 63 which gradually decreases in cross-section in approaching the discharging end of the machine, as shown in Fig. 3. The horn is shown in perspective in Fig. 5 and in cross-section in Fig. 6. It is formed by bending the sheet of metal in the manner shown in Figs. 5 and 6 and it has a longitudinally extending slot as 64 along and through which there is moved in a longitudinal path the upper flap portion of the envelope, as this portion of the flap may be called. This slot may be considered as being provided in the wall portion of the horn. The shape of the horn is such that as an envelope, which has sides extending longitudinally and vertically with the flap of the envelope uppermost, is passed longitudinally along and through the horn the flap of the envelope will be caused by the horn to enter the body of the envelope in the space between the contents of the envelope on the one hand and the back of the envelope on the other hand.

This operation may be properly referred to as tucking the flap into the envelope. During this operation the circular matter within the envelope will be forced downwardly within the envelope if the contents is projecting above the upper or flap edge of the envelope. The member carrying the horn has a longitudinally extending groove portion 65 which engages that front of the envelope. The upper edge of the back of the envelope is engaged by the wall portion or edge portion $63^a$ of the horn. The lower portion of the back of the envelope is controlled by one of the traveling belts and the position is such that the longitudinally extending rib 65 cooperates with the longitudinally extending wall or edge portion $63^a$ and the belt 41 in a manner to impart a kink or bend in the envelope in the portion opposite the rib and in a manner tending to force the back of the envelope from the contents within the envelope, as shown in Fig. 6, and it will here be noted that at this time the upper end of the contents is held toward the front of the envelope by the longitudinally extending edge portion $63^a$. This enables the positioning of the envelope parts in such a manner that the flap can be readily directed by the horn into the space and in this manner be ultimately tucked to final position within the envelope.

It has previously been described how the envelope is moved from its contents-receiving position by the pushing mechanism 48 forcing the envelope and its contents into engagement with one of the longitudinally extending belts, to wit belt 41.

Figure 4:
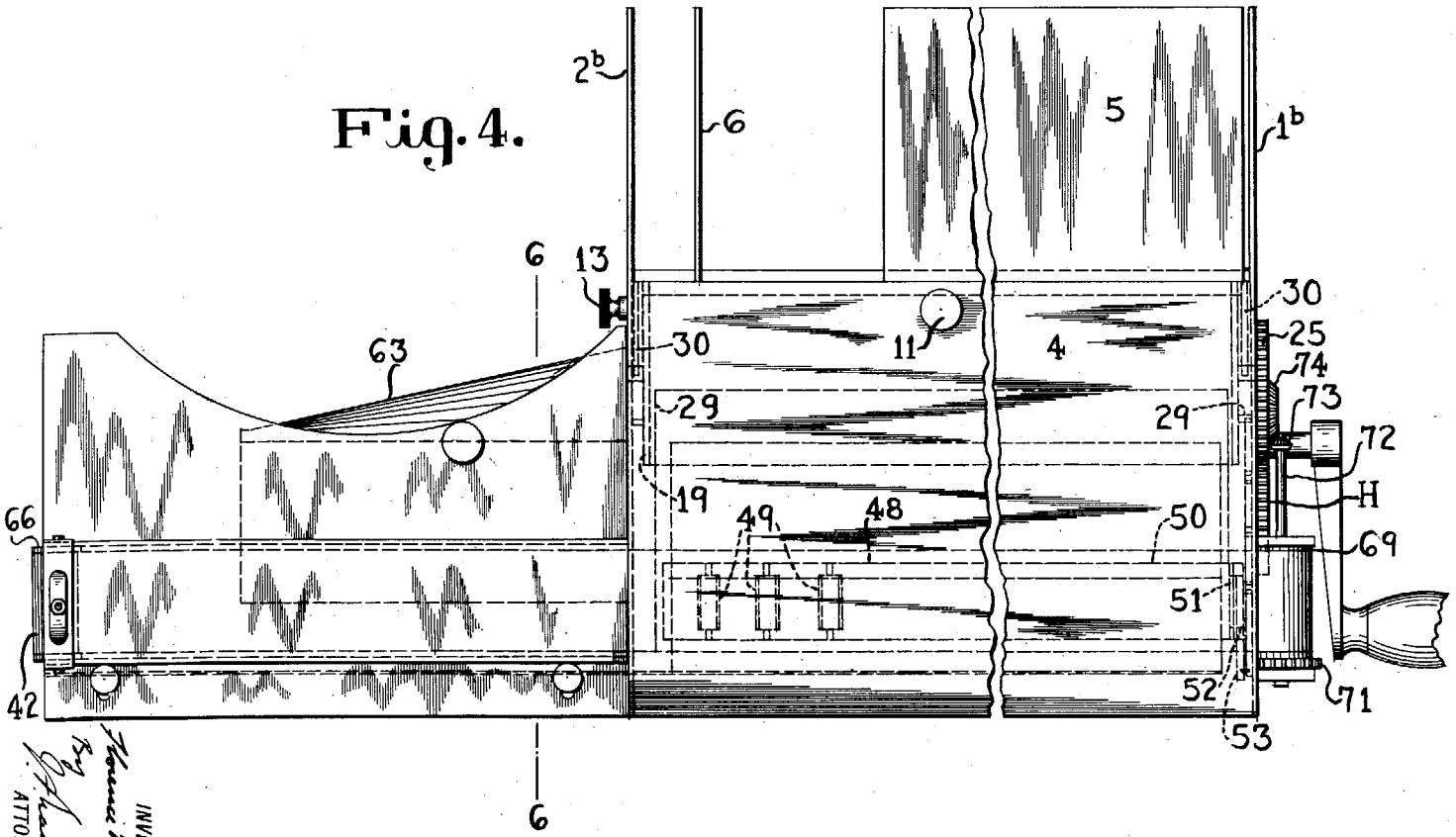

An inspection of Fig. 4 will make it clear that the pushing mechanism 48 does not engage the envelope throughout the entire longitudinal travel of the envelope. The envelope soon leaves this mechanism 48 but before doing so it enters the bite formed by the opposed endless traveling belts 41 and 42, which converge, as previously pointed out, before they approach the delivery or discharge end of the machine. At the delivery end of the machine these belts are normally in engagement with each other, being carried on rollers 66 and 67 normally spring-pressed together, as is clear from an inspection of Figs. 3 and 7. As the rollers are spring-pressed, belts can readily adapt themselves to the conditions of the work. At the charging end of the machine, as the magazine end of the machine may be called, the rollers carrying the longitudinal extending belts are designated by 68 and 69. These rollers are geared together as by gears 70 and 71 and receive the power for driving by means of shaft 72 and bevel-gear 73, the latter of which is in mesh with gear 74 that is connected to the shaft $20^s$ carrying the pulley 20.

The member 37 may be carried on a longitudinally extending bar 75 and to this bar the trough 40 previously described can be adjustably secured in a manner to facilitate vertical adjustment of the latter, if desired. The upper surface $40^a$ of the trough 40 is in alinement with the upper surface of a guide member 76 along which the envelope travels as it is conveyed from the position in the machine where it receives its contents longitudinally from the machine. This stop or guide member 76 is relied upon to oppose any downward thrust which is imparted to the envelope due to the tucking in of the flap by means of the horn as the envelope is moved longitudinally through the horn. This guide member 76 is carried by a suitable housing made of sheet metal which is shown in part in cross-section in Fig. 5. A side view of one of these housings is clearly shown in Fig. 4 and from this last-mentioned figure it will be manifest that the guide member 76 is adjustably secured in place in the lower portion of this housing, whereby the desired vertical adjustment can be attained.

The words "circular matter" as used herein are to be broadly construed as meaning any type of mailing matter which is to be automatically fed toward and inserted into the envelope. The terms "enclosure," "enclosure magazine" and "enclosure feed belt" are also used in the claims for convenience.

The improvements herein set forth are not limited to the precise construction and arrangement shown and described for they may be embodied in various forms and modifications without departing from the spirit and scope of the invention.

What I claim as new is:

1. A machine of the character described, comprising envelope and enclosure magazines at opposite sides adapted to hold the articles in stacks, means for feeding the envelopes and enclosures in timed relation from the bottoms of the stacks inward to the center and there downward to a loading station, a bottom stop against which each envelope arrives at said station and stands to receive its enclosure, and means for conveying the loaded envelopes longitudinally from the loading station.

2. A machine of the character described, comprising envelope and enclosure magazines at opposite sides adapted to hold the articles in stacks, means, comprising belts, for feeding the envelopes and enclosures in timed relation from the bottoms of the stacks inward to the center and there downward to a loading station, a bottom stop against which each envelope arrives at said station and stands to receive its enclosure, and means for conveying the loaded envelopes longitudinally from the loading station.

3. A machine of the character described, comprising envelope and enclosure magazines at opposite sides adapted to hold the articles in stacks, means for feeding the envelopes and closures in timed relation from the bottoms of the stacks inward to the center and there downward to a loading station, means over the inward course of the envelopes for opening their flaps, a bottom stop against which each envelope arrives at said station and stands to receive its enclosure, and means for conveying the loaded envelopes longitudinally from the loading station.

4. A machine of the character described, comprising envelope and enclosure magazines at opposite sides, means for feeding the envelopes and enclosures in timed relation inward to the center and there downward to a loading station, a bottom stop against which each envelope arrives at said station and stands to receive its enclosure, means for conveying the loaded envelopes longitudinally from the loading station, and means for disposing the flaps to which the loaded envelopes are thus conveyed.

5. A machine of the character described, comprising envelope and enclosure magazines at opposite sides adapted to hold the articles in stacks, means for feeding the envelopes and enclosures in timed relation from the bottoms of the stacks inward to the center and there downward to a loading station, a bottom stop against which each envelope arrives at said station and stands to receive its enclosure, means for conveying the loaded envelopes longitudinally from the loading station, and flap-inserting means to which the loaded envelopes are thus conveyed.

6. A machine of the character described, comprising envelope and enclosure magazines at opposite sides adapted to hold the articles in stacks, means for feeding the envelopes and enclosures in timed relation from the bottoms of the stacks inward to the center and there downward to a loading station, a bottom stop against which each envelope arrives at said station and stands to receive its enclosure, a longitudinal guide in extension with said bottom stop, and means for conveying the loaded envelope from the station along said stop and guide.

7. A machine of the character described, comprising envelope and enclosure magazines at opposite sides adapted to hold the articles in stacks, means for feeding the envelopes and enclosures in timed relation from the bottoms of the stacks inward to the center and there downward to a loading station, a bottom stop against which each envelope arrives at said station and stands to receive its enclosure, a longitudinal guide in extension with said bottom stop, means for conveying the loaded envelopes from the station along said stop and guide, and means for disposing the flaps to which the loaded envelopes are thus conveyed.

8. A machine of the character described, comprising envelope and enclosure magazines at opposite sides, means for feeding the envelopes and enclosures in timed relation inward to the center and there downward to a loading station, a bottom stop against which each envelope arrives at said station and stands to receive its enclosure, means for restraining the flaps of the envelopes while standing at said station, and means for conveying the loaded envelopes longitudinally from the loading station.

9. A machine of the character described, comprising envelope and enclosure magazines at opposite sides adapted to hold the articles in stacks, means for feeding the envelopes and enclosures in timed relation from the bottoms of the stacks at inclinations inward to the center and there downward to a loading station, a bottom stop against which each envelope arrives at said station and stands to receive its enclosure, and means for conveying the loaded envelopes longitudinally from the loading station.

10. A machine of the character described, comprising envelope and enclosure magazines at opposite sides adapted to hold the articles in stacks, duplex feed means constantly moving in one direction in its respective halves for conveying the envelopes and enclosures inward to the center and there delivering them downward to a loading station, means for delivering the bottom articles of the envelope and enclosure stacks to said feed means periodically in timed relation, a bottom stop against which each envelope arrives at said station and stands to receive its enclosure, and means for conveying the loaded envelopes longitudinally from the loading station.

11. A machine of the character described, comprising envelope and enclosure magazines at opposite sides adapted to hold the articles in stacks, constantly traveling feed belts passing inward from the magazines to the center where they deliver downward to a loading station, means for delivering the bottom articles of the envelope and enclosure stacks to said feed belts periodically in timed relation, devices over the belts cooperative therewith to conduct the articles and to open the flaps of the envelopes, a bottom stop against which each envelope arrives at the loading station and stands to receive its enclosure, and means for conveying the loaded envelopes longitudinally from the station.

12. A machine of the character described, comprising envelope and enclosure magazines at opposite sides adapted to hold the articles in stacks, means for feeding the articles from the bottoms of the stacks inward to the center and there downward to a loading station comprising belts passing over large rollers beneath the magazines and small rollers adjacent the center arranged so that the upper courses of the belts incline downwards, a bottom stop against which each envelope arrives at the loading station and stands to receive its enclosure, and means for conveying the loaded envelopes longitudinally from said station.

13. A machine of the character described, comprising envelope and enclosure magazines at opposite sides adapted to hold the articles in stacks, means for feeding the envelopes and enclosures in timed relation from the bottoms of the stacks inward to the center and there downward to a loading station, a bottom stop against which each envelope arrives at said station and stands to receive its enclosure, and means for conveying the loaded envelopes longitudinally from the loading station comprising constantly moving unidirectional driving means and a periodically acting traction clutch cooperating therewith.

14. A machine of the character described, comprising envelope and enclosure magazines at opposite sides adapted to hold the articles in stacks, means for feeding the envelopes and enclosures in timed relation from the bottoms of the stacks inward to the center and there downward to a loading station, a bottom stop against which each envelope arrives at said station and stands to receive its enclosure, and means for conveying the loaded envelopes longitudinally from the loading station comprising a constantly traveling belt and a periodically acting traction clutch cooperating therewith.

15. A machine of the character described, comprising envelope and enclosure magazines at opposite sides, means for feeding the envelopes and enclosures in timed relation inward to the center and there downward to a loading station, a bottom stop against which each envelope arrives at said station and stands to receive its enclosure, and means for conveying the loaded envelopes longitudinally from the loading station.

16. A machine of the character described, comprising envelope and enclosure magazines, a stationary stop at a fixed loading station, means for periodically feeding an envelope from the envelope magazine with its lower edge in advance against said stop, and means for periodically and in timed relation feeding an enclosure from the enclosure magazine and inserting the same into the envelope while it remains stationary against said stop.

17. A machine of the character described, comprising envelope and enclosure magazines, a stationary stop at a fixed loading station, means for periodically withdrawing an envelope from the envelope magazine and feeding the same with its bottom edge in advance and its flap uppermost against said stop, a flap-opening device which is encountered by the envelope flap in said movement and turns it back, and means for periodically and in timed relation feeding an enclosure from the enclosure magazine and inserting the same into the envelope while it remains stationary against said stop.

18. A machine of the character described, comprising envelope and enclosure magazines at opposite sides adapted to hold the articles in stacks, means for feeding the envelopes and enclosures in timed relation from the bottoms of the stacks inward to the center and there downward to a fixed loading station, and a stationary bottom stop against which each envelope arrives at said station and stands to receive its enclosure.

19. A machine of the character described, comprising envelope and enclosure magazines at opposite sides, feed belts passing inward from beneath the magazines toward the center where the articles are delivered downward to a loading station, and a flap-opening device over the envelope feed belt.

20. A machine of the character described, comprising envelope and enclosure magazines at opposite sides adapted to hold the articles in stacks, means for feeding the envelopes and enclosures in timed relation from the bottoms of the stacks inward to the center and there downward to a loading station, and a bottom stop against which each envelope arrives at said station and stands to receive its enclosure.

21. In a machine of the character described, the combination of envelope and enclosure magazines, a stationary stop, means for periodically withdrawing an envelope from the envelope magazine and moving the same with its bottom edge forward against said stop, means for periodically in timed relation bringing an enclosure from the enclosure magazine and inserting the same into the envelope while the latter remains stationary against the stop, and means for conveying the loaded envelopes longitudinally away from the loading position at said stop.

22. In a machine of the character described, the combination of envelope and enclosure magazines, a stationary stop, means for periodically withdrawing an envelope from the envelope magazine and moving the same with its bottom edge forward against said stop, means for periodically in timed relation bringing an enclosure from the enclosure magazine and inserting the same into the envelope while the latter remains stationary against the stop, means for conveying the loaded envelopes longitudinally away from the loading position at said stop, and flap-disposing means to which the loaded envelopes are thus conveyed.

23. In a machine of the character described, the combination of envelope and enclosure magazines, a stationary stop and an extension guide in line therewith, means for periodically withdrawing an envelope from the envelope magazine and moving the same with its bottom edge forward against said stop, means for periodically in timed relation bringing an enclosure from the enclosure magazine and inserting the same into the envelope while against the stop, and means for conveying away the loaded envelopes longitudinally along said stop and guide.

24. In a machine of the character described, the combination of envelope and enclosure magazines, a stationary stop and an extension guide in line therewith, means for periodically withdrawing an envelope from the envelope magazine and moving the same with its bottom edge forward against said stop, means for periodically in timed relation bringing an enclosure from the enclosure magazine and inserting the same into the envelope while against the stop, means for conveying away the loaded envelopes longitudinally along said stop and guide, and means for disposing the flaps of the loaded envelopes while their lower edges bear against said guide.

25. In a machine of the character described, the combination of envelope and enclosure magazines, two feed belts extending from opposite sides into proximity to each other to convey and deliver the envelopes and enclosures to a loading station between and below them, a flap-opening device over the envelope feed belt, and a plate over the enclosure feed belt.

26. In a machine of the character described, the combination of envelope and enclosure magazines, two feed belts extending from opposite sides into proximity to each other to convey and deliver the envelopes and enclosures to a loading station between and below them, a flap-opening device over the envelope feed belt, and a plate over the enclosure belt terminating in a curved lip over the down-going delivery bend of the belt.

27. An apparatus for use in positioning an envelope flap which apparatus comprises a longitudinally extending guide member and a longitudinally extending tapering horn having a longitudinally extending slot in the wall portion thereof, which horn is so arranged relatively to the guide member and is so shaped that by moving an envelope along the guide member with the flap portion of the envelope extending into the horn the flap of the envelope will be tucked into the envelope.

28. An apparatus for use in positioning an envelope flap which apparatus comprises a longitudinally extending guide member, an associated longitudinally extending tapering horn having a longitudinally extending slot in the wall portion thereof, and a longitudinally extending rib or member arranged so as to engage the front of the envelope and bend it toward the back whereby the front and back will be separated in a manner to facilitate the tucking of the flap into the envelope by the horn.

29. In combination a longitudinally extending guide member, a longitudinally extending horn connected thereto and arranged thereover, a longitudinally extending slot in the lower wall portion of the horn, and a longitudinally extending rib or member between the guide member and the horn and arranged so as to engage and slightly bend or curve the front of the envelope toward the back of the envelope, the construction of the horn being such that the flap of the envelope will be tucked into the envelope as the envelope entering the horn is moved along the guide member.

30. In combination a longitudinally extending guide member, a longitudinally extending horn connected thereto and arranged thereover, a slot in the lower wall portion of the horn to permit the entrance of the flap portion of an envelope as the envelope is moved logitudinally along the guide member, and a longitudinally extending rib or member located between the guide member and an edge of the horn and arranged so as to engage and slightly bend the front of the envelope, the construction of the horn being such that the flap of the envelope will be tucked into the envelope as the envelope is moved through the horn.

31. An apparatus of the class described comprising in combination a storage magazine for envelopes, another storage magazine for circular matter, an endless feeding belt and pulleys therefor for conveying an envelope from its storage magazine at one side of the machine toward the center of the machine with the closed long edge of the envelope foremost and with the back of the envelope uppermost, means for causing an opening of the flap of the envelope as thus conveyed, means for deflecting the closed long edge of the envelope downwardly, means for arresting the downward movement of the envelope when in a position where the circular matter can be inserted therein, there being means for holding back the flap which is at the top of the envelope during the time the circular matter is being inserted in the envelope, means for conveying the circular matter from its storage magazine and for inserting said circular matter into the envelope, and means for moving the envelope into which the contents has been inserted longitudinally along a gradually tapering horn into which the upper or flap portion of the envelope extends, the construction of the horn being such that during said movement the flap of the envelope will be tucked into the envelope between the contents thereof and the back of the envelope.

32. An apparatus of the class described comprising in combination a storage magazine for envelopes, another storage magazine for circular matter, an envelope feeding pawl, mechanism for conveying an envelope released by said envelope feeding pawl from one side of the machine toward the center of the machine, means for opening the flap of the envelope as conveyed, means for deflecting the forward ends of the envelope downwardly, means for arresting the downward movement of the envelope when in a position where the circular matter can be inserted therein, a circular matter feeding pawl, mechanism for conveying the circular matter when released by said circular matter feeding pawl from the other side of the machine and for inserting the circular matter into the envelope, and means for moving the envelope with the contents therein longitudinally along and through a tapering horn into which the upper portion of the envelope extends, the construction of the horn being such that the flap of the envelope will be tucked into the envelope between the contents thereof and the inner side of the back of the envelope.

33. An apparatus of the class described comprising in combination a storage magazine for envelopes and in which the envelopes are placed with the flaps of the envelope uppermost and at the rear side of the magazine, a feed catch or pawl at the forward lower edge of the magazine, feeding means comprising a continuous belt that travels over a pulley arranged with the axis of the pulley below the forward edge of the magazine, means associated with the feeding means and said pawl or catch for periodically releasing an envelope at the bottom of the stack whereby it can be fed forwardly by frictional engagement with the continuous belt of the feeding means, the construction of said feeding means being such that that portion of the belt which fits the envelope slopes forwardly and slightly downwardly, and an envelope guiding or engaging member arranged above the belt so as to hold the body of the envelope against the belt and the rear edge of which guiding or engaging member is shaped so as to engage the under side of the flap in a manner to effect a turning back of the flap as the envelope moves forward.

34. An apparatus of the class described comprising in combination companion transversely extending endless belts, the upper operative surface of one of which belts extends transversely and downwardly and feeds an envelope forwardly and in one direction as to the right, the upper operative surface of the other of which belts extends transversely and downwardly and feeds circular matter forwardly and in an opposite direction as to the left, a guiding or engaging member above the envelope feeding belt and arranged to deflect the forward closed edge of an envelope downwardly as the belt conveying the envelope turns about its inner guide pulley, a stop arranged below the space between the adjacent portion of the companion belts, the position of the guide member over the belt and of the stop being such that the stop arrests the downward movement of the envelope in a position where the circular matter can be inserted into the envelope but so that the guide member over the belt will hold the free end of the flap backward, and a guide member over the belt for conveying the circular matter which guide member is shaped so that it deflects the forward end of the circular matter downwardly into the envelope when the envelope has been positioned to receive it.

35. An apparatus of the class described comprising in combination transversely extending belts, the upper surface of one of which belts extends inwardly and downwardly and feeds an envelope forwardly and in one direction as to the right and the upper surface of which companion belts extends inwardly and downwardly and feeds circular matter forwardly and in an opposite direction as to the left, a guiding member arranged above the envelope feeding belt and arranged to deflect the forward closed edge of an envelope downwardly as the belt conveying the envelope turns about its inner pulley, a stop arranged in the space between the adjacent portion of the companion belts so as to limit the downward travel of the envelope, the position of the guide member over the belt and of the stop being such that the stop arrests the downward movement of the envelope in a position where the circular matter can be inserted into the envelope but so that the guide member over the belt will hold the rear free end of the flap backward, and a guide over the belt for conveying the circular matter, which guide member is shaped so that it deflects the forward end of the circular matter downwardly into the envelope after the envelope has been thus positioned, said machine also having a guide member which enters the space between said endless belts and the upper end of which guide member extends upwardly and backwardly in a manner to strip the forward edge of the envelope from its feeding belt prior to the body of the envelope being fed vertically downwardly.

36. An apparatus of the class described comprising in combination transversely extending belts arranged so that the upper surface of one belt extends inwardly and downwardly and feeds an envelope forwardly and in one direction as to the right and the upper surface of the companion belt extends inwardly and downwardly and feeds circular matter forwardly and in another direction as to the left, a guiding member above the envelope feeding belt and arranged to deflect the forward closed edge of an envelope downwardly as the belt conveying the envelope turns about one of its guide pulleys, a stop arranged in the space between the adjacent portion of the companion belts so as to limit the downward travel of the envelope, the position of the guide member over the envelope feeding belt and of the stop being such that the stop arrests the downward movement of the envelope in a position where the circular matter can be inserted into the envelope but so that the guide member over the belt will hold the rear free end of the flap backward, a guide member over the belt for conveying the circular matter which guide member is shaped so that it deflects the forward end of the circular matter downwardly into the envelope after the envelope has been thus positioned, said machine also having a guide member which enters the space between said endless belts, the upper end of which guide members extends upwardly and backwardly in a manner to strip the forward edge of the envelope from its feeding belt prior to the body of the envelope being fed vertically downwardly, and means for feeding the envelope from the position where it receives its contents.

37. A machine of the class described comprising in combination a pair of adjacent longitudinally extending pulleys over each of which there moves a continuous belt, an envelope feeding belt which travels over one of said pulleys, a circular matter feeding belt which travels over the other of said pulleys, a guide member or envelope releasing member which extends into the space between said belts and which is bent into engagement with the envelope feeding belt so as to insure a moving of the envelope from the belt as the envelope is moved along by the belt, an envelope guiding member arranged to engage and deflect the envelope as it moves along the belt and over said first mentioned guide member or releasing member, a stop for limiting the movement of the envelope when it reaches a certain position between said belts, a circular matter guiding member for deflecting the circular matter into the envelope when the envelope is in a position to receive it and as the circular matter is fed toward and into the envelope, and means for feeding the envelope and its contents longitudinally in a horizontal direction.

38. A machine of the class described comprising in combination a pair of adjacent longitudinally extending pulleys over which there moves continuous belts, a continuous envelope feeding belt which travels over one of said pulleys, a continuous circular matter feeding belt which travels over the other of said pulleys, a guide member or releasing member which extends into the space between said belts and which is bent into engagement with the envelope feeding belt so as to insure a lifting of the envelope from the belt as it moves along with the belt, an envelope guiding member arranged to engage and deflect the envelope as it moves along the belt and over said guide or releasing member, a stop for limiting the movement of the envelope when it reaches a certain position between said belts, a circular matter guiding member for deflecting the circular matter into the envelope when the envelope is in a position to receive it and as the circular matter is fed toward and into the envelope, and means for feeding the envelope and its contents longitudinally in a horizontal direction with the contents in the envelope, said longitudinal feeding means, said envelope feeding means, said circular matter feeding means and said means for moving the envelope with the circular matter therein being operated from a common source of power and in timed relationship with respect to each other.

39. A machine of the class described comprising in combination an envelope feeding pawl, a continuous envelope feeding belt, a circular matter feeding pawl, a continuous circular matter feeding belt, an envelope releasing member which extends into the space between said belts and which is bent into engagement with the envelope feeding belt so as to insure a moving of the envelope from the belt as the envelope is moved by the belt, an envelope guiding member arranged to engage and deflect the envelope as it is moved by the belt over the envelope releasing member, a stop for limiting the movement of the envelope when it reaches a certain position between said belts, a circular matter guiding member for deflecting the circular matter into the envelope when the envelope is in a position to receive it and as the circular matter is fed toward and into the envelope, and means for feeding the envelope and its contents longitudinally, said envelope feeding pawls, said envelope feeding means, said circular matter feeding pawls, said circular matter feeding means and said means for moving the envelope with the circular matter therein longitudinally being operated from a common source of power and in timed relationship with respect to each other.

40. An apparatus of the class described comprising in combination means for bringing an envelope to a position where circular matter can be inserted therein, means for inserting the circular matter within the envelope, and means for moving the envelope in a longitudinal direction through a horn that engages the flap of the envelope and which is arranged so as to tuck the flap of the envelope between the inner side of the back of the envelope and the circular matter within the envelope.

41. A machine of the character described, comprising envelope and enclosure magazines, a stationary stop at a fixed loading station, means for feeding an envelope from the envelope magazine with its lower edge in advance against said stop, and means for feeding an enclosure from the enclosure magazine and inserting the same into the envelope while it remains stationary against said stop.

42. The combination with an envelope magazine, of means for feeding the envelopes successively edgewise from the delivery end of said magazine, the edgewise movement being in a direction transverse to the flap and toward the bottom of the envelope, and a stationary flap opener adapted to enter beneath the flap of each envelope and move the flap from closed to open position as the envelope is moved past the flap opener in the aforesaid direction.

43. A machine of the character described, comprising envelope and enclosure magazines, a stationary stop at a fixed loading station, means for feeding an envelope from the envelope magazine with its lower edge in advance against said stop, a flap-opener located adjacent the path of the envelope on its way to the stop adapted to enter beneath the flap of the envelope and move the flap from closed to open position as the envelope is moved edgewise past the flap-opener in a direction transverse to the flap and toward the bottom of the envelope, and means for feeding an enclosure from the enclosure magazine and inserting the same into the envelope while it remains stationary against said stop.

44. A machine of the character described, comprising envelope and enclosure magazines, a stationary stop at a fixed loading station, means for feeding an envelope from the envelope magazine with its lower edge in advance against said stop, means for feeding an enclosure from the enclosure magazine and inserting the same into the envelope while it remains stationary against said stop, and means for conveying each envelope when loaded away from the loading station in an edgewise and endwise direction.

45. A machine of the character described, comprising envelope and enclosure magazines, a stationary stop at a fixed loading station, means for feeding an envelope from the envelope magazine with its lower edge in advance against said stop, a flap-opener located adjacent the path of the envelope on its way to the stop adapted to enter beneath the flap of the envelope and move the flap from closed to open position as the envelope is moved edgewise past the flap-opener in a direction transverse to the flap and toward the bottom of the envelope, means for feeding an enclosure from the enclosure magazine and inserting the same into the envelope while it remains stationary against said stop, and means for conveying each envelope when loaded away from the loading station in an edgewise and endwise direction.

FLORENCE McCARTHY.